US011210089B2

(12) United States Patent
Byrne et al.

(10) Patent No.: US 11,210,089 B2
(45) Date of Patent: Dec. 28, 2021

(54) VECTOR SEND OPERATION FOR MESSAGE-BASED COMMUNICATION

(71) Applicant: Hewlett Packard Enterprise Development LP, Houston, TX (US)

(72) Inventors: John L. Byrne, Palo Alto, CA (US); Harumi Kuno, Palo Alto, CA (US); Jeffrey Drummond, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/508,769

(22) Filed: Jul. 11, 2019

(65) Prior Publication Data
US 2021/0011720 A1    Jan. 14, 2021

(51) Int. Cl.
*G06F 13/28* (2006.01)
*G06F 9/30* (2018.01)
*G06F 9/54* (2006.01)
*G06F 13/40* (2006.01)

(52) U.S. Cl.
CPC ......... *G06F 9/30036* (2013.01); *G06F 9/544* (2013.01); *G06F 9/546* (2013.01); *G06F 13/28* (2013.01); *G06F 13/4027* (2013.01)

(58) Field of Classification Search
CPC .. G06F 9/30036; G06F 9/546; G06F 13/4027; G06F 9/544; G06F 13/28
See application file for complete search history.

(56) References Cited

U.S. PATENT DOCUMENTS

| | | | | |
|---|---|---|---|---|
| 5,193,149 A | * | 3/1993 | Awiszio | G06F 15/17375 |
| | | | | 709/250 |
| 8,244,902 B2 | * | 8/2012 | Oved | G06F 9/542 |
| | | | | 709/231 |
| 8,903,935 B2 | * | 12/2014 | Grant | H04L 67/025 |
| | | | | 709/212 |
| 10,572,260 B2 | * | 2/2020 | Hughes | G06F 9/3004 |
| 10,891,156 B1 | * | 1/2021 | Zhao | G06N 20/00 |

(Continued)

FOREIGN PATENT DOCUMENTS

WO    WO-2017151138 A1    9/2017

OTHER PUBLICATIONS

High Performance RDMA-Based MPI Implementation over InfiniBand by Jiuxing Liu, Jiesheng Wu, and Dhabaleswar K. Panda, International Journal of Parallel Programming, vol. 32, No. 3, Jun. 2004 (Year: 2004).*

(Continued)

*Primary Examiner* — Jing-Yih Shyu
(74) *Attorney, Agent, or Firm* — Sheppard Mullin Richter & Hampton LLP

(57) ABSTRACT

Methods and systems for conducting vector send operations are provided. The processor of a sender node receives a request to perform a collective send operation (e.g., MPI_Broadcast) from a user application, requesting a copy of data in one or more send buffers by sent to each of a plurality of destinations in a destination vector. The processor invokes a vector send operation from a software communications library, placing a remote enqueue atomic send command for each destination node of the destination vector in an entry of a transmit data mover (XDM) command queue in a single call. The processor executes all of the commands in the XDM command queue and writes the data in the one or more send buffers into each receive queue of each destination identified in the destination vector.

20 Claims, 7 Drawing Sheets

(56) References Cited

U.S. PATENT DOCUMENTS

| | | | | |
|---|---|---|---|---|
| 2006/0080668 | A1* | 4/2006 | Blackmore | G06F 9/544 |
| | | | | 719/312 |
| 2009/0077268 | A1* | 3/2009 | Craddock | H04L 12/1886 |
| | | | | 709/250 |
| 2011/0078249 | A1* | 3/2011 | Blocksome | G06F 9/544 |
| | | | | 709/206 |
| 2013/0185375 | A1* | 7/2013 | Aho | G06F 9/4401 |
| | | | | 709/212 |
| 2014/0281243 | A1* | 9/2014 | Shalf | G06F 12/0842 |
| | | | | 711/122 |
| 2017/0255501 | A1* | 9/2017 | Shuler | G06F 9/542 |
| 2018/0275872 | A1 | 9/2018 | Benisty et al. | |
| 2019/0188111 | A1* | 6/2019 | Ozog | G06F 11/3093 |

OTHER PUBLICATIONS

Kalia et al., "Design Guidelines for High Performance RDMA Systems", Proceedings of the 2016 USENIX Annual Technical Conference, Jun. 22-24, 2016, pp. 437-450.

Markatos et al., "The Remote Enqueue Operation on Networks of Workstations", Institute of Computer Science, available online at <https://www.ics.forth.gr/carv/telegraphos/CANPC98>, Dec. 5, 1997, 13 pages.

Mellanox, "RDMA Aware Networks Programming User Manual", Rev 1.7, Mellanox Technologies, 2015, pp. 1-216.

Thakur et al., "Optimization of Collective Communication Operations in MPICH", The International Journal of High Performance Computing Applications, vol. 19, No. 1, 2005, pp. 49-66.

Anuj Kalia et al., "Using RDMA Efficiently for Key-Value Services," Jun. 2014, pp. 1-22, CMU-PDL-14-106, Carnegie Mellon University, Pittsburgh, PA, USA.

Open MPI, "Tuning the Run-Time Characteristics of MPI InfiniBand, RoCE, and iWARP Communications," Jan. 17, 2019, pp. 1-14 (online), Retrieved from the Internet on Feb. 18, 2019 at URL: <open-mpi.org/faq/?category=openfabrics>.

Weikuan Yu, "Enhancing MPI with Modern Networking Mechanisms in Cluster Interconnects," Dissertation, 2006, pp. 1-188, Ohio State University, USA.

\* cited by examiner

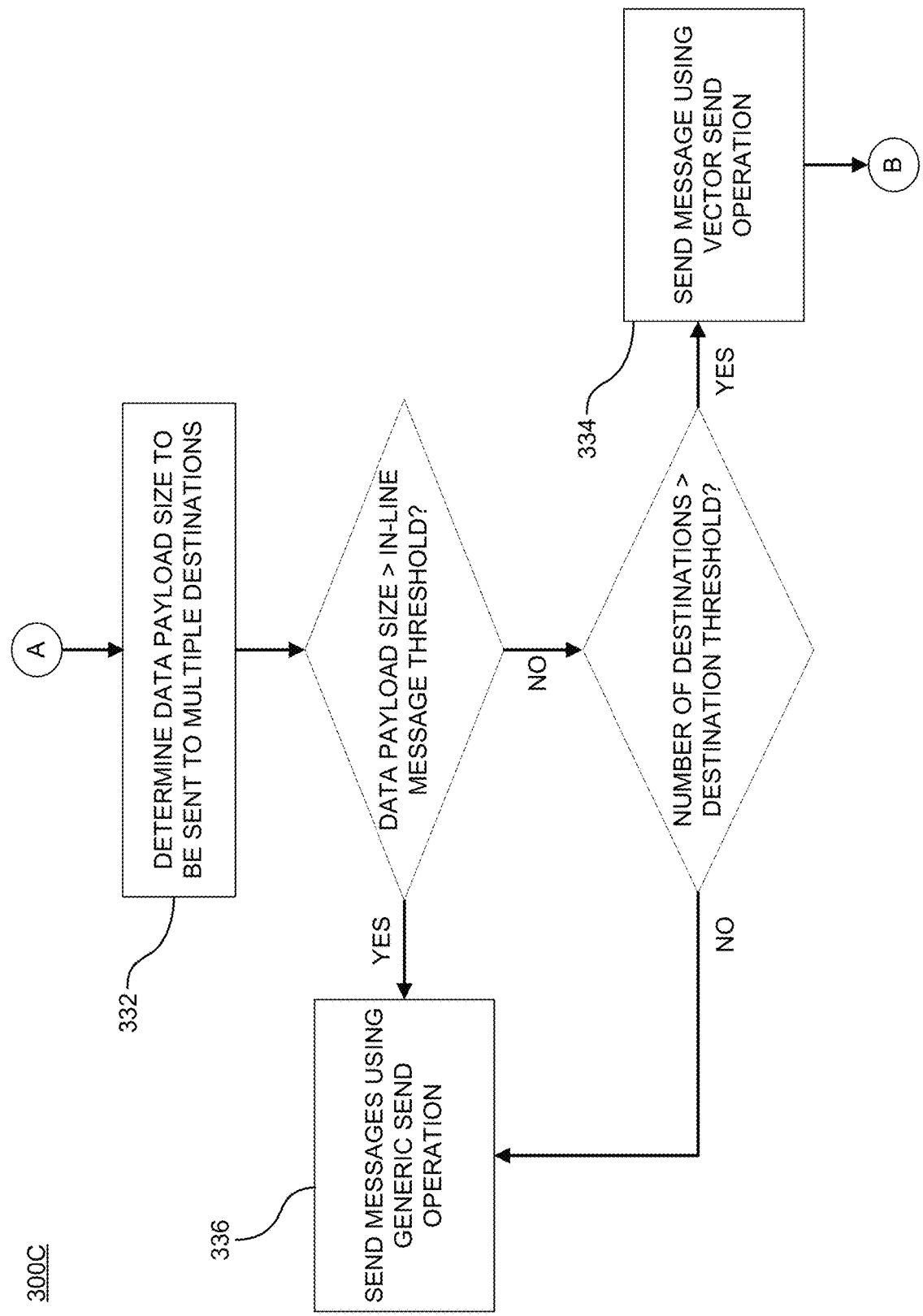

VECTOR SEND OPERATION FOR MESSAGE-BASED COMMUNICATION

STATEMENT OF GOVERNMENT RIGHTS

This invention was made with government support under Government Subcontract No. B621301 awarded by the Department of Energy. The government has certain rights in the invention.

DESCRIPTION OF RELATED ART

Traditionally, programmed input/output (I/O) operations involve the central processing unit (CPU) for every transaction. The CPU is fully occupied during the duration of the read or write operation, therefore being unavailable to perform any other work. Direct memory access (DMA) enables hardware components of computer systems to bypass the CPU for performing read or write operations, allowing the hardware to access portions of main system memory (i.e., random access memory (RAM)). After initiating a transfer, the CPU goes on to perform other operations. A DMA controller performs the transaction and, upon completion, optionally provides an interrupt to the CPU indicating that the operation is done. DMA provides benefits to multiple processing systems.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3C is an example vector send decision process in accordance with embodiments of the technology disclosed herein.

Figure 1:
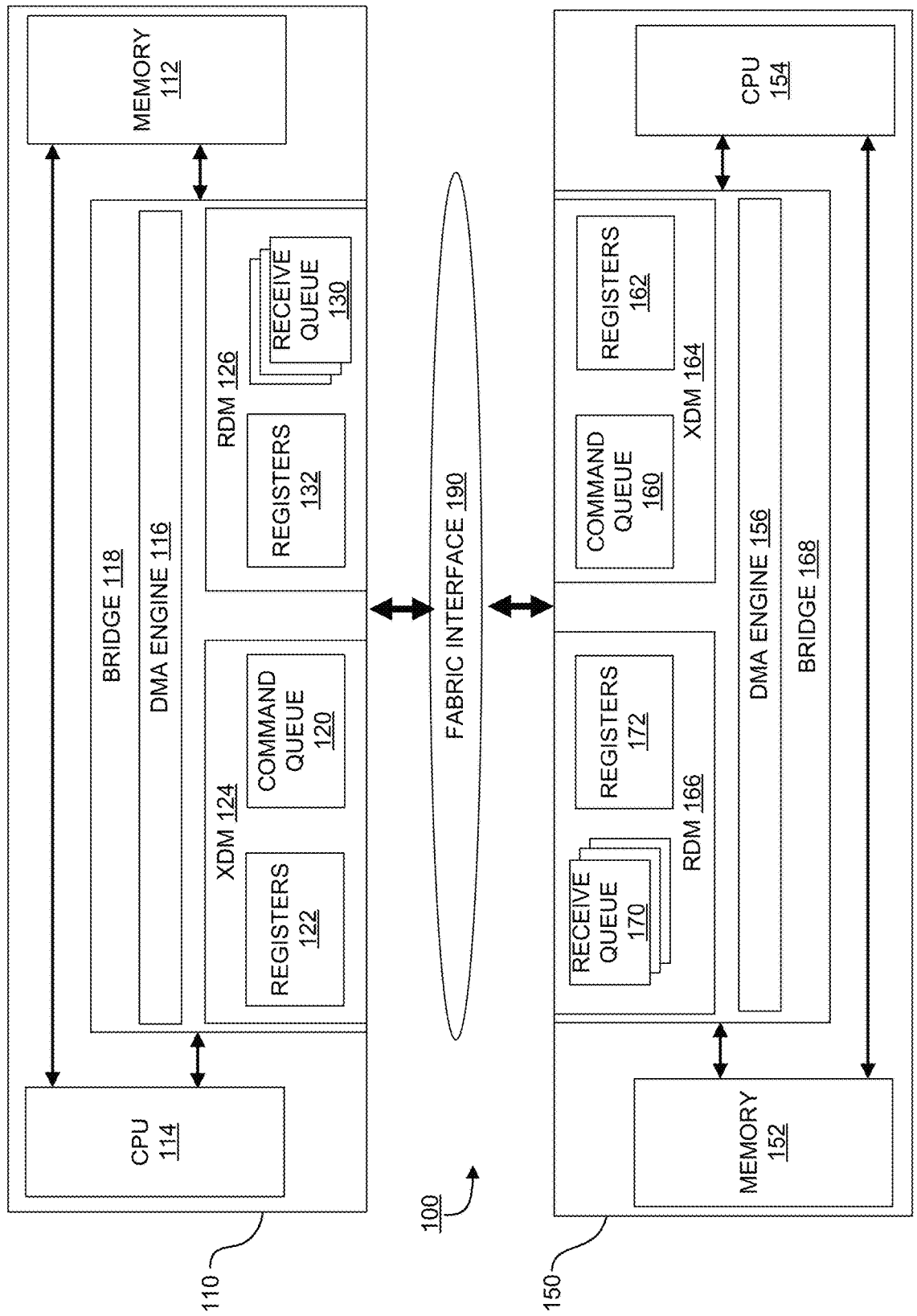
FIG. 1 is an example high-performance computing architecture in accordance with embodiments of the technology disclosed herein.

The figures are not exhaustive and do not limit the present disclosure to the precise form disclosed.

DETAILED DESCRIPTION

A visible bottleneck arises when performing collective communication operations (i.e., sending messages to or receiving messages from multiple destinations) using DMA. Collective communication is an important and frequently used component of Message Passing Interface (MPI) and other message passing techniques. Non-limiting examples of collective communication operations commonly used in multi-processing systems include all-to-all, broadcast, barrier, gather, reduce, and scatter. Sending such collective operation messages incur both hardware overheads (e.g., bandwidth) and software overheads (e.g., message creation). The time associated with a sending a message between two nodes can be modeled as:

$$\alpha + n\beta, \quad (1)$$

where $\alpha$ is the latency (including both hardware and software overheads) per message, independent of message size, $\beta$ is the transfer time per byte, and n is the number of bytes transferred.

When the message sent is large, bandwidth (i.e., $\beta$) dominates equation 1 above. When the transfer rate is low (i.e., a small number of bits are capable of being sent in a period of time), the overall time it takes to send the message increases as the number of bytes increases. Adding additional bandwidth to a system can be done to address the impact of bandwidth on the message sending time. When messages are small, however, the per-message set up cost dominates, including both hardware and software overheads. Every message incurs some appreciable overhead. When many small messages need to be sent, such as during a collective communication operation, each message incurs a start-up cost, all of which can add up to impact the total time it takes to perform collective operations (where the message is being sent to or received from multiple destinations). Hardware overhead may be diminished through the use of specialized hardware, such as Remote DMA (RDMA) controllers and other hardware, which proportionally increases the contribution of software overhead to latency.

Embodiments of the present disclosure are directed to reducing the software costs for sending collective operation messages, including small-size messages. As discussed in greater detail below, the technology disclosed herein provides to the implementers of collective operations a vector-based function. A vector send operation is provided which accepts a vector of one or more destination addresses and one or more buffers of data as arguments. At least one receive completion queue of the DMA engine of each destination device is reserved for receiving vector send messages. A large number of send commands are placed within a data mover's transmit queue for transmission to a remote data mover. After the data arrives in the receive data mover's reserved queue, an interrupt may be generated and software can immediately read data from the reserved queue buffer without competing with other traffic for access. In some embodiments, the solution can be dynamically tuned to account for knowledge about the overall collective operation being performed (e.g., how much data being sent to how many ranks). Implementing the technology in accordance with embodiments discussed below enables multicast functionality without the need for specialized hardware support by reducing the initial software set up costs for each message. Accordingly, embodiments of the present disclosure are compatible with existing tuned collective operation implementations offered by programming libraries, without changing their algorithms. Implementing embodiments of the present disclosure at the communication library level enables dynamic tuning to leverage information about the capabilities of the underlying hardware and the overall collective operation being performed.

FIG. 1 illustrates an example high-performance computing architecture 100 in accordance with embodiments of the present disclosure. As shown, high-performance computing architecture 100 is configured to enable remote direct memory access (RDMA) to occur between different nodes within the architecture 100. RDMA permits one node to directly access (to read and/or write) the memory of a separate node without involving either node's central processing unit (CPU), enabling parallel memory accesses (by the RDMA hardware) and operation performance (by the CPU). Example architecture 100 is provided for illustrative purposes only and should not be interpreted as limiting the scope of the technology described herein to only the illustrated environment. A person of ordinary skill would understand that the embodiments of the technology are applicable for use in any environment in which one-to-many communication is required. For ease of discussion, architecture 100 will be described with reference to only a single destination node 150 receiving commands and data from sender node 110 to more clearly identify elements of the claims recited below. A person of ordinary skill in the art would understand that additional components necessary for operation of the overall system would be included in an implementation. Therefore, omission of such additional components should not be interpreted as limiting the scope and/or enablement of the embodiments discussed herein. Moreover, any node within a system can serve as sender node 110 or destination node 150, depending on which node is performing the vector send operation in accordance with embodiments of the present disclosure.

As shown in FIG. 1, architecture 100 comprises a sender node 110, a destination node 150, and a fabric interface 190. Although only two nodes are shown, environment 100 can comprise a plurality of nodes, all interconnected through fabric interface 190 to perform high-performance computing functions. In various embodiments, fabric interface 190 can be one of a variety of high-performance networking fabrics known in the art. Non-limiting examples of such fabric interfaces 190 include InfiniBand Verbs, RDMA over Converged Ethernet (RoCE), Gen-Z, 10 Gigabit Ethernet, iWarp, and Omni-Path, among others. Embodiments in accordance with the present disclosure can work with any known or future developed network fabric utilized.

Sender node 110 comprises a memory 112, a central processing unit (CPU) 114, and a bridge 118. As discussed above, direct memory access allows the CPU of a node to perform other operations while a read or write operation is performed, allowing for parallel processing. As discussed above, direct memory access allows the CPU to perform other operations while a read or write operation is being performed. As shown in FIG. 1, CPU 114, memory 112, and bridge 118 are communicatively coupled. In various embodiments, CPU 114, memory 112, and bridge 118 can be coupled over a wired connection, such as but not limited to one or more communication buses, optical connectors, electrical cabling or traces, among other known methods of communicatively coupling computing hardware components. When CPU 114 needs to perform a read or write operation, CPU 114 sends a command to bridge 118 to perform the memory access. With respect to embodiments of the present disclosure, CPU 114 would perform a vector send operation that would send multiple commands to bridge 118 (discussed in greater detail below). CPU 114 and memory 112 can comprise any known processor or non-transitory memory resource known in the art. A person of ordinary skill in the art would understand how to implement the technology with respect to any processing or non-transitory memory resources that are available within a given implemented node. In various embodiments, CPU 114, memory 112, and bridge 118 can be included as a single device, or as one or more devices communicatively connected using a bus communication protocol such as (but not limited to) peripheral component interconnect (PCI), PCI express (PCIe), small computer system interface (SCSI), among others. A person of ordinary skill in the art would appreciate that how each node is constructed does not impact the applicability of the technology disclosed herein, as embodiments of the present disclosure can be used within any parallel computing architectures.

Bridge 118 can be a computing component creating a single aggregate network for multiple communication networks or network segments, connecting these networks or segments as if they were a single network. Bridge 118 can also be referred to as a Layer 2 bridge in the Open Systems Interconnection (OSI) model. In various embodiments, bridge 118 can comprise an application specific integrated circuit (ASIC) connected to CPU 114 and memory 112. In various embodiments, bridge 118 can include a DMA engine 116, a transmit data mover (XDM) 124, and a receive data mover (RDM) 126. DMA engine 116 (sometimes referred to as an embedded DMA controller) is a subset of hardware, configured to perform remote memory accesses without the support of a CPU (e.g., CPU 114). In various embodiments, DMA engine 116 can be configured to execute software and/or firmware instructions for performing DMA operations. In various embodiments, DMA engine 116 can comprise circuitry for performing processing tasks, such as but not limited to application specific integrated circuits (ASICs), programmable logic arrays (PLAs), programming array logics (PALs), complex programmable logic devices (CPLDs), field programmable gate arrays (FPGAs), logical components, among others. In some embodiments, memory 112 can comprise one or more non-transitory memory resources configured to store the instructions executed by DMA engine 116.

In various embodiments, DMA engine 116 can be a separate component of bridge 118, configured to manage the operation of XDM 124 and RDM 126. In other embodiments, each of XDM 124 and RDM 126 can have its own dedicated DMA engine 116.

XDM 124 and RDM 126 are configured to transfer to or receive from messages from other nodes (i.e., sender nodes 110 and destination nodes 150) within architecture 100. XDM 124 is responsible for transmitting data from a node (acting as sender node 110 for that data) to one or more other nodes (i.e., destination nodes 150) over fabric 190. XDM 124 can include a command queue 120 comprising one or more registers 122, each register 122 configured to maintain one or more commands to be performed by XDM 124. In various embodiments, XDM 124 can comprise one or more command queues 120 (and associated registers 122) configured to maintain commands for data reads or writes. As discussed in greater detail below with respect to FIGS. 3A-3C, when CPU 114 performs a vector send operation, CPU 114 would send multiple commands to bridge 118, DMA engine 116, placing a command into each register 122 of command queue 120 associated with each of the intended destination nodes 150 for that vector send operation. In various embodiments, XDM 124 can comprise one or more command queues 120, and a subset of the one or more command queues 120 (and associated registers 122) can be reserved for maintaining vector send operation commands. As a non-limiting example, one of the one or more command queues 120 can be reserved for use in performing the vector send operation. As another non-limiting example, one of the one or more command queues 120 can be reserved for each process type or rank executing within sender node 110, each reserved command queue 120 configured to maintain vector send operations for each of the intended receiving destination nodes 150 associated with that process-type or rank.

In various embodiments, RDM 126 can comprise one or more receive queues 130 configured with one or more registers 132 to maintain the commands received from any XDM 164 of a connected destination node 150 in architecture 100. XDM 164 includes a command queue 160 and registers 162, which are as described with respect to command queue 120 and registers 122, respectively. In various embodiments, one or more of the receive queues 130 are reserved for receiving vector send operations specifically. Upon receipt of a vector send operation in the associated registers 132 of reserved receive queue 130, DMA engine 156 can generate an interrupt to send to CPU 154, informing CPU 154 that the commands are stored and enabling immediate access to the data without competing with other traffic for access. That is, rather than the vector send operation having to wait to be executed in a first-in, first-out manner from a generic receive queue behind larger and/or more complex commands, the simpler vector send operation enables send commands to be executed in a faster manner, in parallel with other commands from other processes. In various embodiments, a separate receive queue 130 can be reserved for each process-type or rank of the process in destination node 150 issuing the vector send operation. By having multiple reserved receive queues, each reserved for each type of potential process-type or rank within architecture 100. In some embodiments, a receive queue 130 may be reserved for more than one process-type or rank of the sending process.

Reservation of at least one receive queue 170 for vector send messages (i.e., a type of data traffic) enables incoming vector send messages to be processed in a simpler manner. Each RDM 166 of a destination node 150 is capable of receiving messages from any XDM 124 (i.e., vector send messages are placed in the memory buffer of receive queue 170) within the connected network. Dedicating at least one receive queue 170 for vector send-type traffic can remove such messages and operations from the normal message queue, allowing for faster performance of the vector send operation. In embodiments where a separate receive queue 170 is reserved for each process-type of rank, the performance of vector send operations within the network can be further simplified by ensuring that the vector send operation is being performed in an efficient manner for each rank without interruption from intervening non-vector send messages from processes of a different rank.

Sender node 110 is communicatively coupled to destination node 150 over fabric interface 190. Destination node 150 can be the same type of device as sender node 110. The nature of the node is dependent on the particular implementation. In various embodiments, destination node 150 may include CPU 154, memory 152, and a bridge 168 comprising DMA engine 156, XDM 164, and RDM 166. RDM 166 includes receive queues 170 and registers 172. XDM 164 includes command queue 160 and registers 162. A person of ordinary skill in the art would appreciate that similar components between sender node 110 and destination node 150 would operate in a similar manner. A node within architecture 100 is a sender node 110 when initiating the vector send operation, and is a destination node 150 when receiving a data in one of its receive queues 170.

Figure 2:
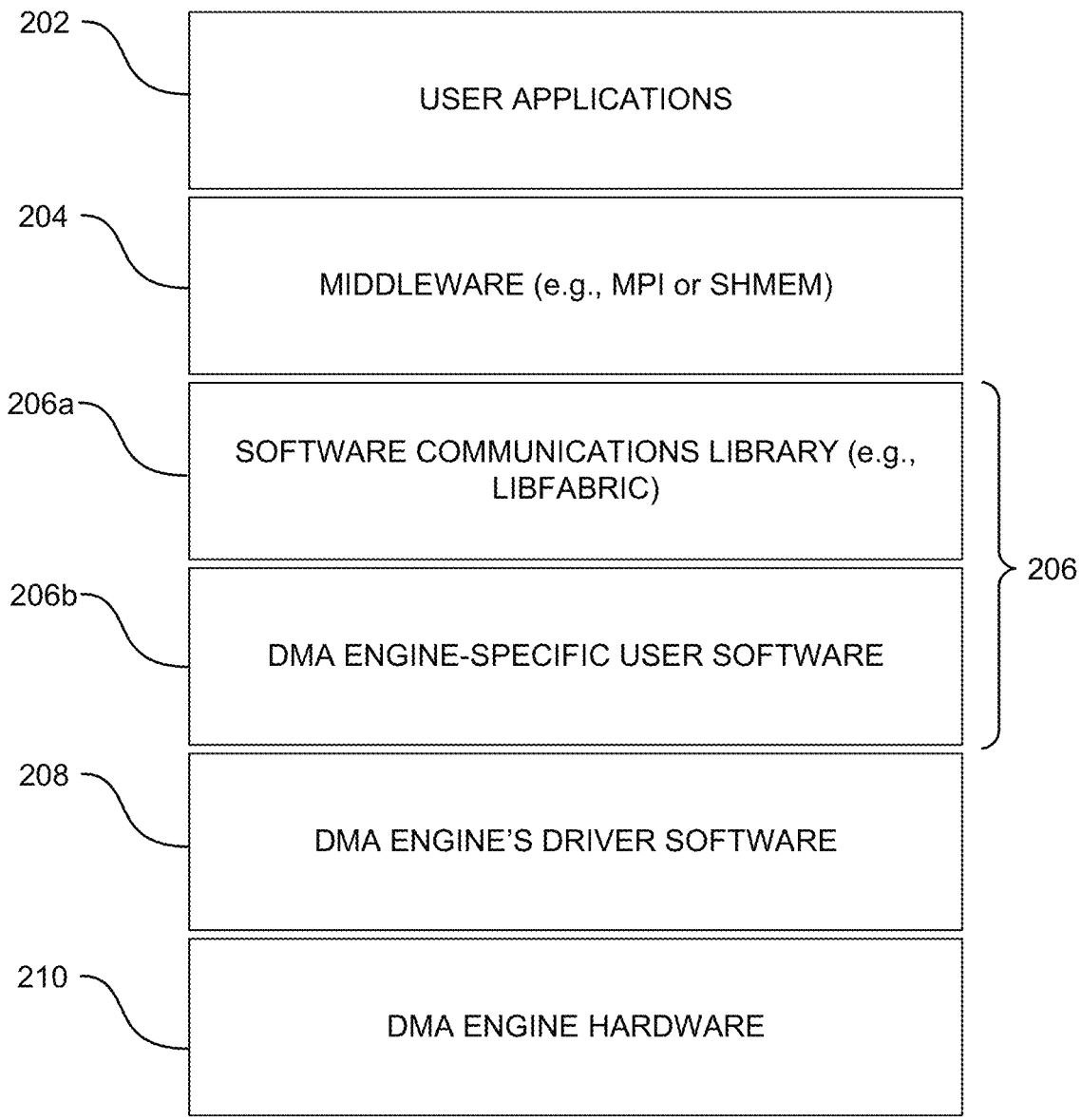
FIG. 2 shows an example software/hardware stack in accordance with embodiments of the technology disclosed herein.

As discussed above, embodiments of the technology disclosed herein provide a vector send functionality to architecture 100 at the DMA Engine's user library/driver software level. FIG. 2 shows an example software/hardware stack 200 in accordance with embodiments of the technology disclosed herein. The top layer is the applications layer 202. This is the highest most layer, serving as the human/machine interface (HMI) to the system. Through programming frameworks at the middleware layer (e.g., in special implementations of collective operations) or user applications at the application layer, users can request a vector send operation generated to push data to a plurality of different destination nodes.

Middleware in the middleware layer 204 serves as an application programming interface (API) for translating function calls from various user applications in the application layer 202 for particular functions into a common form. Examples of middleware software found in middleware layer 204 include message passing interface (MPI), symmetric hierarchical memory (SHMEM), or other collections of libraries defining how function calls are to be written or translated. In various embodiments, some or all of the middleware layer 204 may be exposed to the user. For ease of discussion, the technology of the present disclosure shall be discussed with respect to the MPI standard. This should not be interpreted to limit the scope of the technology, however, as the technology is applicable regardless of the particular form in which a user application may initiate a collective operation.

Every layer of the software stack 200 involved in sending a message contributes to the overhead impacting latency a. As a non-limiting example, a collective operation implemented by programming middleware in middleware layer 204 that sends multiple messages as a result of a single operation invoked by a user application incurs less overhead at user application layer 202 than would be incurred if user application layer 202 submitted multiple individual message send operations. A non-limiting example of such a collective operation is the MPI_Broadcast call that can be called by a user application. A user application at layer 202 can invoke MPI_Broadcast once for sending the same message to a thousand recipients. If that same Broadcast were to be implemented using individual message send operations by the user application, then the user application layer 202 would incur the overhead of submitting a thousand MPI_Send operations, as opposed to the overhead of submitting a single MPI_Broadcast operation. However, at middleware layer 204, in the absence of specialized hardware, the programming middleware must distribute the overhead of a thousand individual point-to-point messages across multiple processes. Each of these individually generated point-to-point messages then is submitted individually, in turn, to the DMA engine's specific user software 206b and driver software 208. Although the overhead is distributed across multiple processes, fundamentally we are still bound by a.

Communication libraries are typically implemented in two layers—a "north facing" API that is used by the middleware frameworks (e.g., MPI or SHMEM implementations) and a "south facing" API that is implemented by DMA-specific user software. As illustrated in FIG. 2, communication API layer 206 is split into the "north facing" software communications library layer 206a and the "south facing" DMA engine-specific user software library layer 206b. The DMA-specific user software implements the south-facing API using calls to the DMA engine's user library and driver software. The vector send operation would be implemented by the DMA Engine-specific software and then exposed through the upper layers of the software stack. In accordance with embodiments of the technology disclosed herein, a vector send operation is added to architecture 100 at DMA engine-specific user software library layer 206b, being exposed to middleware layer 204 via software communications library layer 206a. The vector send operation provides a low overhead software solution providing multicast functionality without the need for specialized multicast hardware. In various embodiments, the vector send operation can be invoked, including as inputs a vector of destination addresses as well as the identification of one or more send buffers of the sender node whose contents are to be sent to a plurality of destination nodes. For example, through an application a user may select to conduct a multicast broadcast to a group of destination nodes. The middleware (e.g., MPI) invokes vector send (vector, buffers), wherein the variable "vector" comprises an identification of a vector of destination addresses for the intended nodes, and the variable "buffers" is an indication of the send buffers containing information to written to the destination addresses. Send buffers are different from the command queue (comprising one or more buffers) because send buffers comprise the data to be written while the command queue (i.e., command queue buffer) comprises send commands to the XDM to execute writing the data contained in the send buffers to remote nodes. Software communications library layer 206a comprises a well-defined interface for communicating commands (including send commands) over fabric interface 190 discussed with respect to FIG. 1. By exposing the vector send operation to the software communications library layer 206a, embodiments of the present disclosure further exposes the operation to the higher layers. This enables middleware in middleware layer 204 and applications in applications layer 202 to leverage information about the overall collective operation being performed as well as information regarding the capabilities of the underlying hardware.

With reference to the non-limiting example discussed above with respect to user application layer 202, a Broadcast collective operation invoked using a single MPI_Broadcast call by a user application from a single source to a thousand recipients requires middleware layer 204 to distribute the processing of each separate point-to-point message individually across multiple processes in turn to the underlying software communications library 206a. Implementing embodiments of the technology disclosed herein, programming middleware at layer 204 would translate the MPI_Broadcast call from the user application layer 202 by calling a vector send operation from software communications library 206a. This single vector send operation would result in a single operation submitted in turn to the DMA engine's user library/driver software (i.e., DMA engine's user specific software 206b and DMA engine's driver software 208). Therefore, rather than utilizing multiple processes and individually submitting the messages, the vector send operation accepts a destination vector identifying all of the intended recipients and submits the result to DMA engine's user specific software 206b. The DMA engine's user library/driver software would then convert the single vector send operation submitted into a single submission of a thousand point-to-point send commands executed by the DMA Engine hardware, reducing the overhead of increasing the parallelism/fan-out of communicating with the plurality of recipients.

In various embodiments, the vector send operation results in a plurality of remote enqueue atomic operation send commands, one associated with each destination of the destination vector. For ease of discussion, embodiments of the present disclosure will be described with respect to vector send implementations in architectures using remote enqueue atomic operations. However, this description is provided for illustrative purposes only and should not be interpreted as limiting the scope of the technology disclosed herein. As a non-limiting example, the vector send operation in accordance with embodiments of the present disclosure can be implemented using one-sided collective operations.

A remote enqueue atomic operation is an operation that atomically inserts a data element in a queue that physically resides in a remote node's memory (i.e., remote node's processor's memory). A receive queue is a data structure residing in the remote processor's memory with receive buffers (i.e., registers) in which message arrival notifications can be atomically enqueued through a hardware method. The data to be sent is assumed to have been moved directly to its destination slot in the remote node's memory, increasing the efficiency for the receiving node to process the data by eliminating the need for an additional copy of the data from the receive queue to the location in memory. However, a separate remote enqueue atomic operation is processed for each destination by programming middleware in middleware layer 204 and software communications API layer 206, resulting in overhead costs like those discussed above. For a plurality of short messages, the need to process each message individually can result in a large bottleneck. Moreover, specialized hardware is still required to provide the multicast support.

As a non-limiting example, assume that there are four destination nodes to which a sender node wants to send the same message (i.e., multicast). A destination vector is generated, the destination vector comprising a plurality of destination addresses received through a user application in various embodiments, while in other embodiments the destination vector is identified during a discovery phase. The send buffers containing the information to be included in the message are also identified. In various embodiments, the identification can include a single identification representing all of the desired send buffers with data to be sent, while in other embodiments each send buffer may be entered in series as additional arguments to the vector send function. When vector_send( ) is invoked, identifiers (e.g., pointers, IDs, offsets, hashes, etc.) for the vector and the send buffers are set as variables in vector_send( ). In various embodiments, invoking vector_send( ) is performed by a processor at middleware layer 204, with the programming middleware, in response to receiving a request from user application layer 202 to perform a collective send operation, invokes the vector_send( ) operation from software communications layer 206a. The vector send operation commences, generating a plurality of remote enqueue atomic operation send commands for each of the four destinations, and placing those send commands as entries into the (logically) single command buffer of the XDM of the sender. In various embodiments, placing the send commands in entries comprises placing the send commands into registers of the XDM.

The vector send operation can be added to software communications library 206a through, but not limited to, a new library, as an addition to a pre-existing library, or as a separate library also maintained at software communications library 206a. The vector send operation enables software communications library 206a to instruct DMA Engine-specific user software 206b to immediately place a large number of send commands into a data mover's XDM (i.e., XDM discussed with respect to FIG. 1), increasing the rate with which vector send operations may be submitted compared to ordinary send messages. Currently in the art, send commands are each processed individually by the programming middleware in middleware layer 204 and software communications library 206a. That is, the traditional send operation requires the programming middleware in middleware layer 204 and software communications library 206a to process the send instructions individually to generate the send command for each intended destination. This approach increases the software overhead, requiring each message to go through the entire process when being sent to multiple recipients despite the fact that much of the initial setup for generating the send command would be the same for every intended destination, with the only main difference being the destination address included in the send command. Moreover, because each send command is processed individually, it is possible that other operations (e.g., a progress thread) or commands can be processed in between the individual sends. In such cases, completion of the collective operation can be delayed as not all processes have reached a synchronization point among all the processes. Where a large number of smaller messages are being broadcast to multiple destinations, the bottleneck caused by the delay in completion can impact the operation of the system.

Rather than requiring each send command to be individually processed at the middleware layer 204 and software communication library layer 206a, the vector send operation of the present disclosure allows for the setup instructions to be executed once at those layers, with the loop being focused on generating a vector containing address information for each destination.

DMA engine's driver software 208 comprises the set of instructions defining the functions of the DMA engine. In various embodiments, the non-transitory instructions discussed above with respect to memory 112 can be considered part of this layer. DMA engine's driver software layer 208 can include instructions for operating all the components of a DMA engine, such as DMA engine 116 discussed with respect to FIG. 1. The driver software controls operation of the DMA engine hardware components at the DMA engine hardware layer 210. This layer 210 comprises the hardware components comprising the DMA engine, including but not limited to logic gates and arrays, electrical traces, adders, registers, flip switches, and other circuitry components that can be used in a common DMA engine.

DMA engine-specific user library software layer 206b comprises the set of instructions defining the functions that expose the functionality of the DMA engine's driver software 208 and that can be invoked by user-space applications such as software communications layer 206a, programming middleware layer 204, and user applications 202.

Embodiments of the present disclosure are capable of working in a complementary manner to previous solutions for making DMA operations more efficient focused on enabling multicast communication within different layers of the example stack 200 discussed with respect to FIG. 2. As a non-limiting example, at the DMA engine hardware layer 210, specialized RDMA hardware configured to facilitate multicast communication has been used. Some RDMA hardware solutions enable an offloading functionality for collective operations, allowing the RDMA hardware itself to offload collective operations to a dedicated subportion of the hardware. However, specialized RDMA hardware can be costly. The technology disclosed herein can be implemented within existing RDMA hardware architectures and increase the overall efficiency of the system by enabling faster processing of messages by the messaging software (i.e., programming middleware and software communications libraries). Moreover, embodiments of the present disclosure are capable of being implemented with optimized implementations of collective operations at the applications level. Non-limiting examples of optimizations with which embodiments of the present disclosure can be implemented include multicast algorithms, Pragmatic General Multicast (PGM), tree-based algorithms, ring-based algorithms, phase algorithms, Chang-Roberts algorithm, Lelann algorithm, among others.

Figure 3A:
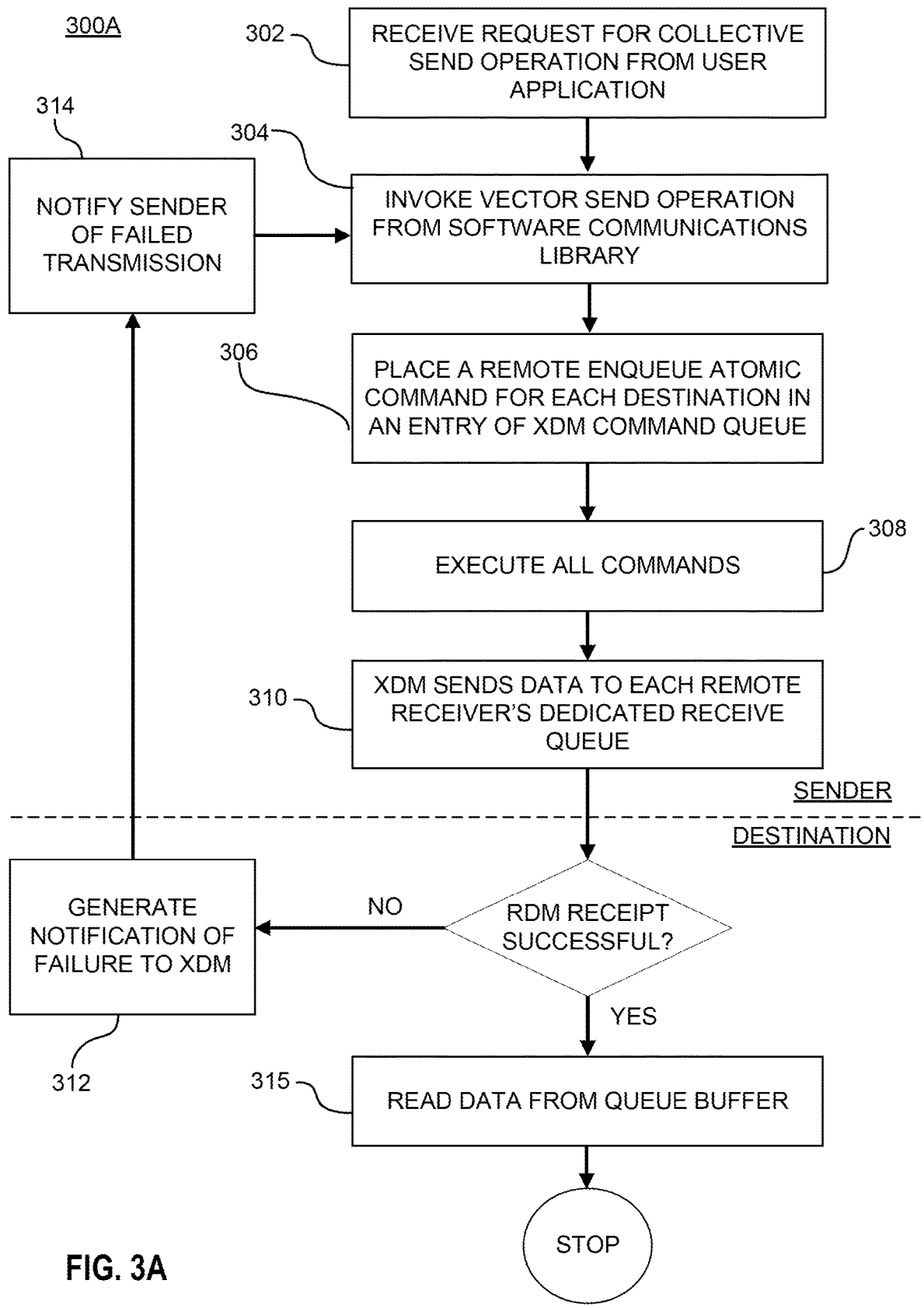
FIG. 3A is an example vector send operation in accordance with embodiments of the technology disclosed herein.

FIG. 3A is an example vector send operation 300A in accordance with embodiments of the technology disclosed herein. Example vector send operation 300A is provided for illustrative purposes only, and should not be interpreted as limiting the scope of the technology to only the embodiment shown. In various embodiments, the respective portions of vector send operation 300A are performed by one of a number of processing cores of the CPU of the sender node or receiver node, respectively. In other embodiments, vector send operation 300A may be performed by the DMA engine within each bridge of the sender node and receiver node, such as DMA engines 116, 156 of sender node 110 and destination node 150, respectively. In some embodiments, the processing capability of the bridge may be combined within the same processing resource as a node's CPU.

Figure 4:
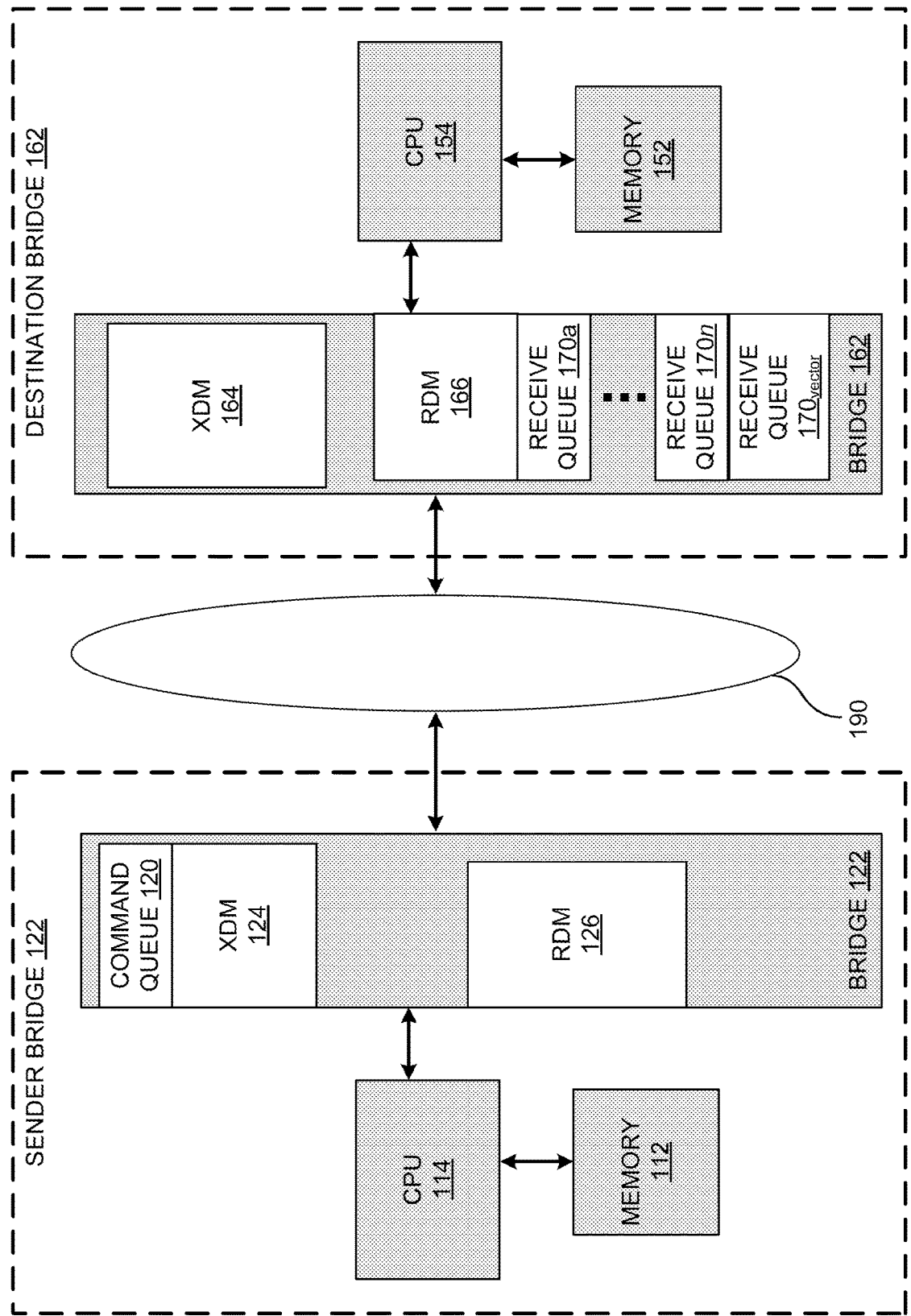
FIG. 4 is an example expanded view of a sender's and destination's DMA engines in accordance with embodiments of the technology disclosed herein.

At operation 302, a request to perform a collective send operation is received from a user application. Requesting a collective send operation comprises a user application making a call to a programming middleware API function associated with collective operations. As a non-limiting example, an MPI-compatible user application can call MPI_Broadcast to initiate a collective send operation. In various embodiments, the user application may include a destination vector in the request, an identification of one or more send buffers containing data that is to be sent in the collective send operation to the plurality of destinations. The destination vector can comprise a list of identifiers for dedicated remote receive queues, like receive queue $170_{vector}$ shown in FIG. 4. By utilizing a dedicated receive queue $170_{vector}$, vector send operation messages are ensured to be processed without interruption before other messages from non-vector send processes that may have arrived in the interim. In various embodiments, the destination vector may be a pre-generated listing of all remote queue addresses, chosen specifically by the application (and/or the user), or a combination thereof. In various embodiments, the addresses for the destination vector can be discovered during a discovery phase, or can be pre-loaded into each XDM for use in sending a message to multiple destinations.

At operation 304, the vector send operation is invoked from the software communications library. As discussed above, the vector send operation in accordance with embodiments of the present disclosure can be implemented as a function call in software communications API layer 206. The destination vector and one or more identified send buffers comprise the arguments for the vector send operation (e.g., vector_send(vector, buffers)). In various embodiments, additional arguments may be included in the vector send operation.

At operation 306, the vector send operation places multiple send commands in the XDM command queue. Each send command created is associated with a different one of the multiple destinations identified by the vector of destination addresses taken as an input to the vector send operation. The data payload of each send command includes a message to be sent to all of the destinations identified in the vector of destination addresses. The command queue may be similar to command queue 120 shown in FIGS. 1 and 4. Each remote enqueue atomic send command is generated by replacing the address field of the first remote enqueue atomic operation generated with the address of the next destination in the vector. The message is common for each destination, making individual message generation for each destination redundant and adding to the overall latency. In this way, all of the required remote enqueue atomic operations can be generated without the additional overhead required to set the message portion of each entry individually. Using a single function, embodiments of the present disclosure allow for all the necessary messages required to be sent to a destination node, rather than needing the upper level software to individually process each message to be sent. In various embodiments, the send commands are all generated and placed in the XDM command queue in a single operation, rather than requiring the continued invocation of the standard send operation.

At operation 308, the DMA engine executes all of the send commands created by the vector send operation within the XDM command queue. The send commands in the XDM command queue are executed without interruption from commands of any other processes, ensuring that the collective operation is completed without interruption by an intervening command of a different process. The XDM of the sender node sends the data to remote receiver's dedicated receive queue at operation 310. In various embodiments, sending the data can comprise writing the message into the dedicated receive queue of each remote receiver for which a send command existed within the sender's XDM command queue. In various embodiments, the XDM may be similar to XDM 124 discussed above with respect to FIG. 1 and below with respect to FIG. 4. The message can comprise pointers or other identifiers to the locations where processing data is located, while in some embodiments the message can comprise the actual data itself (e.g., in-line messaging functionality). In various embodiments, the message written to the remote receiver's receive queue is a notification that the sender had placed data a memory location identified in the notification, such that the CPU of the receiver, upon reading the messages in the receive queue, is made aware of the location of the newly written data for subsequent reference. Where the data itself is also included in the message written to the receive queue, the CPU may be capable of extracting the data and write it to the memory location identified in the message. In various embodiments, the RDM of the destination can comprise a plurality of receive queues 170a-170n, of which dedicated receive queue $170_{vector}$ is one. By dedicating at least one receive queue to vector send operation commands only, the burden on the destination node is reduced because all of the messages can easily be accounted for in one place. By dedicating one queue for vector send operation messages received, it further ensures that the messages will be performed as necessary without interruptions from other messages sent by different nodes/processes. In various embodiments, a plurality of receive queues may be dedicated to vector send operation messages.

To this point, vector send operation 300A has described operations occurring on the sender side of the system. On the destination side (indicated by the demarcation line), the RDM of the receiving node (i.e., destination node or remote receiver (used interchangeably)) checks to see whether the write attempt by XDM of the sender node (i.e., operation 310) was successful. An attempted DMA operation can fail for a variety of reasons. If the attempt was successful, the destination reads the message from the receive queue buffer at operation 315. If the attempt is deemed unsuccessful, a failure notification is generated by the DMA engine of the receiving node at operation 312 and send the notification to the DMA engine on the sender side of the system. At operation 314, the sender is notified that the send operation failed. The sender (e.g., a user, an application) can retry the write by returning to operation 304 and issuing an atomic vector send operation. In various embodiments, upon receipt of a failure notification, the sender node may automatically attempt to rewrite the data at operation 304.

Figure 3B:
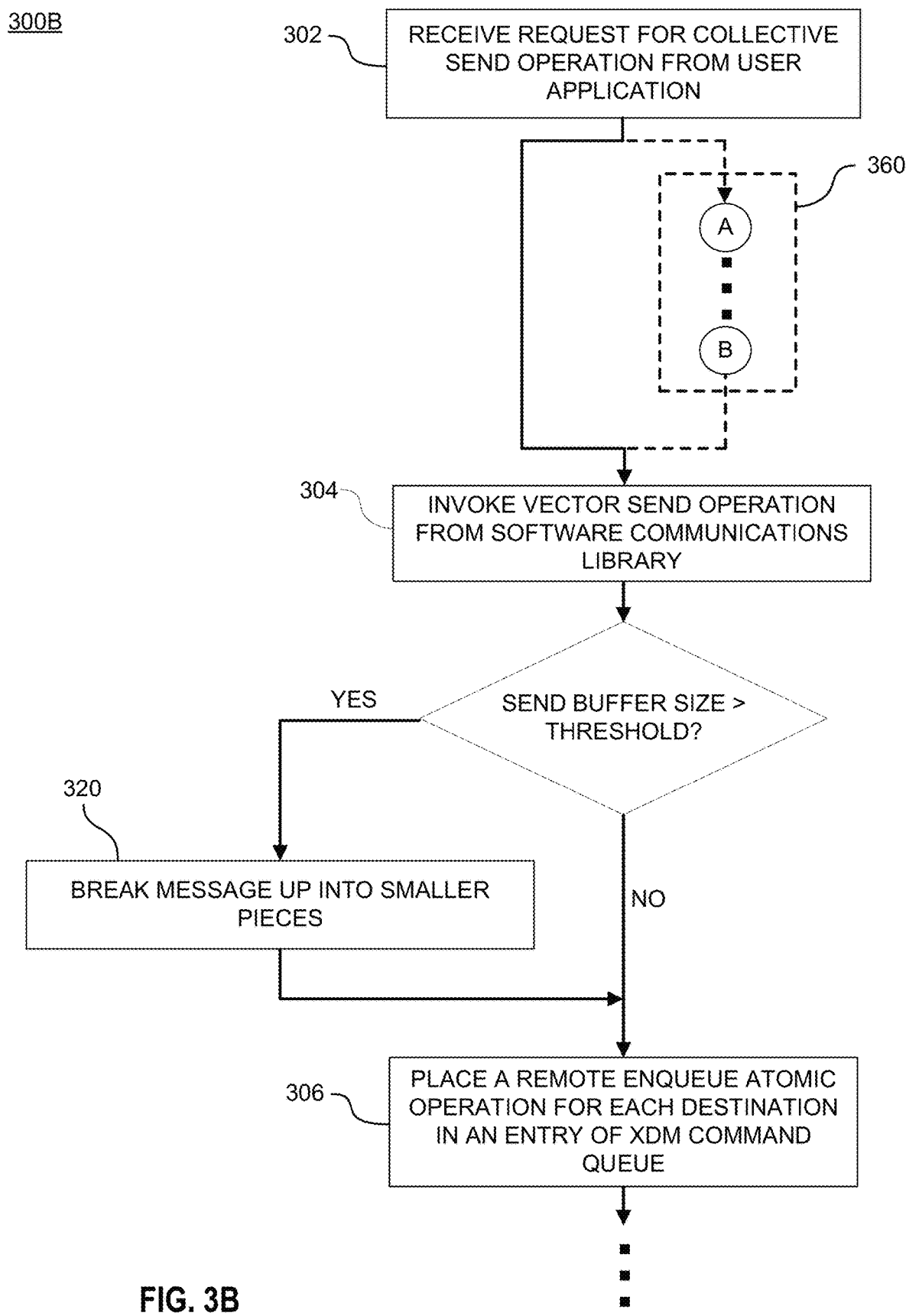
FIG. 3B is an example long-message vector send operation in accordance with embodiments of the technology disclosed herein.

In various embodiments, the size of the send buffers may exceed a threshold capacity of a message. That is, the amount of data to be written exceeds the amount that can be written for a single vector send transfer. In such embodiments, example long-message vector send operation 300B can be used. As illustrated in FIG. 3B, long-message vector send operation 300B comprises a determination after operation 304 but before operation 306 of vector send operation 300A shown in FIG. 3A. Where common references are used in different figures, all descriptions of such common reference elements shall be interpreted as applying to all references in the figures and description unless otherwise stated. As can be seen in FIG. 3B, after invoking the vector send operation at operation 304, the size of the one or more send buffers is checked to ensure that the send buffer is not too large for transfer. In various embodiments, the buffer size threshold can be set at an upper bound on the amount of data which can be included in a message sent through the vector send operation, while in others the buffer size threshold can be set at a percentage of the upper bound. As a non-limiting example, the threshold may be set between 75% to 100% of the upper bound. If the send buffer size is below the buffer size threshold, the process returns to operation 306 and continues on applying the vector send operation 300A discussed with respect to FIG. 3A. However, if the buffer size threshold is exceeded, the data in the send buffer may be broken up into smaller chunks at operation 320. In various embodiments, breaking up the data of the send buffer into smaller chunks can comprise allocating additional command buffer resources to use for the particular transfer. After breaking up the oversized send buffers, the operation once again returns to the basic vector send operation 300A.

As discussed above, embodiments of the present disclosure is exposed to middleware layer 204 and application layer 202, enabling dynamic tuning of the vector send operation. Each embodiment exposes information on the knowledge of the whole collective operation and the underlying hardware capabilities to the programming applications and/or middleware, which can be used in determining how (or if) to perform a vector send operation. FIG. 3C illustrates an example vector send decision process 300C in accordance with embodiments of the present disclosure. Although described with respect to example vector send decision process 300C, embodiments of the present disclosure should not be limited to only the illustrative example. For ease of discussion, vector send decision process 300C is described with respect to an implementation wherein the data is written in-line with the message. A person of ordinary skill in the art, however, would understand that the embodiments of the present disclosure are applicable to other methods of transmitting the data. For example, larger messages could be sent using the vector send techniques. The example process 300C can be performed prior to invoking the vector send operation, as illustrated by the optional branch 360 in FIG. 3B. Although only shown in FIG. 3B, example process 300C could also be performed optionally within example process 300A discussed with respect to FIG. 3A. In some embodiments, both example process 300B and 300C may be performed in addition to example process 300A.

As shown in FIG. 3C, middleware software 204 can determine the size of the data payload (i.e., message) to be sent to multiple destinations (i.e., a collective operation to a plurality of destinations) at operation 332. The data payload comprises the data discussed above with respect to operation 310 of FIG. 3A. For collective operations, the same message may be sent to each of the multiple destinations. Accordingly, the data payload size is the same for each message. The in-line message threshold can vary depending on the transmission protocol used in the system and on the DMA engine. In various embodiments, the in-line message threshold can be pre-determined and stored within one or more registers or other storage units of the DMA engine, while in other embodiments middleware software 204 can dynamically determine the available size of inline messages. In addition, the user-facing API for software communications library 206a may expose an API call for querying the DMA Engine to determine size of the inline data payload size.

Use of in-line messaging is limited by the data payload size capable of being placed with the header of a message. DMA engine-specific user software 206b can compare the determined data payload size to an in-line message threshold in various embodiments. If the determined data payload size is determined to be greater than the in-line method threshold, DMA engine-specific user software 206b can send the messages using a generic send operation at operation 336. In various embodiments, a generic send operation is the native send operation of DMA engine-specific user software 206b.

If the determined data payload size is determined to not exceed the in-line message threshold, DMA engine-specific user software 206b determines if the total number of destinations is below a destination threshold. In various embodiments, use of the vector send operation may be bounded by the number of destinations to which the data payload is to be sent, whereby if the number of messages to be sent are not large enough the benefits of using the disclosed vector send operation may be reduced and/or negligible. In various embodiments, the destination threshold can be determined during the design of the node, the available bandwidth, the protocol of the fabric interface, among other criteria for indicating what number of destinations are required for the benefits of vector send to be worth using that approach over the basic send operation. In some embodiments, programming middleware 204 may determine the destination threshold based on the overall collective operation to be performed. In various embodiments, the lowest destination threshold can be one destination, while in other embodiments vector send operation can always be used (i.e., destination threshold=0).

Where the data payload size does not exceed the destination threshold, the DMA engine can send the messages using the generic send operation 336 discussed above. As discussed above, when the number of destinations is below the destination threshold the benefits of using vector send may be limited. In such cases, it may be more efficient to use the generic send operation. Where the number of destinations exceed the destination threshold, however, the benefits can be realized. Therefore, in such cases, software communications library 206a can send the messages using the vector send operation at operation 334, such as the example processes discussed with respect to FIGS. 3A and 3B.

Figure 5:
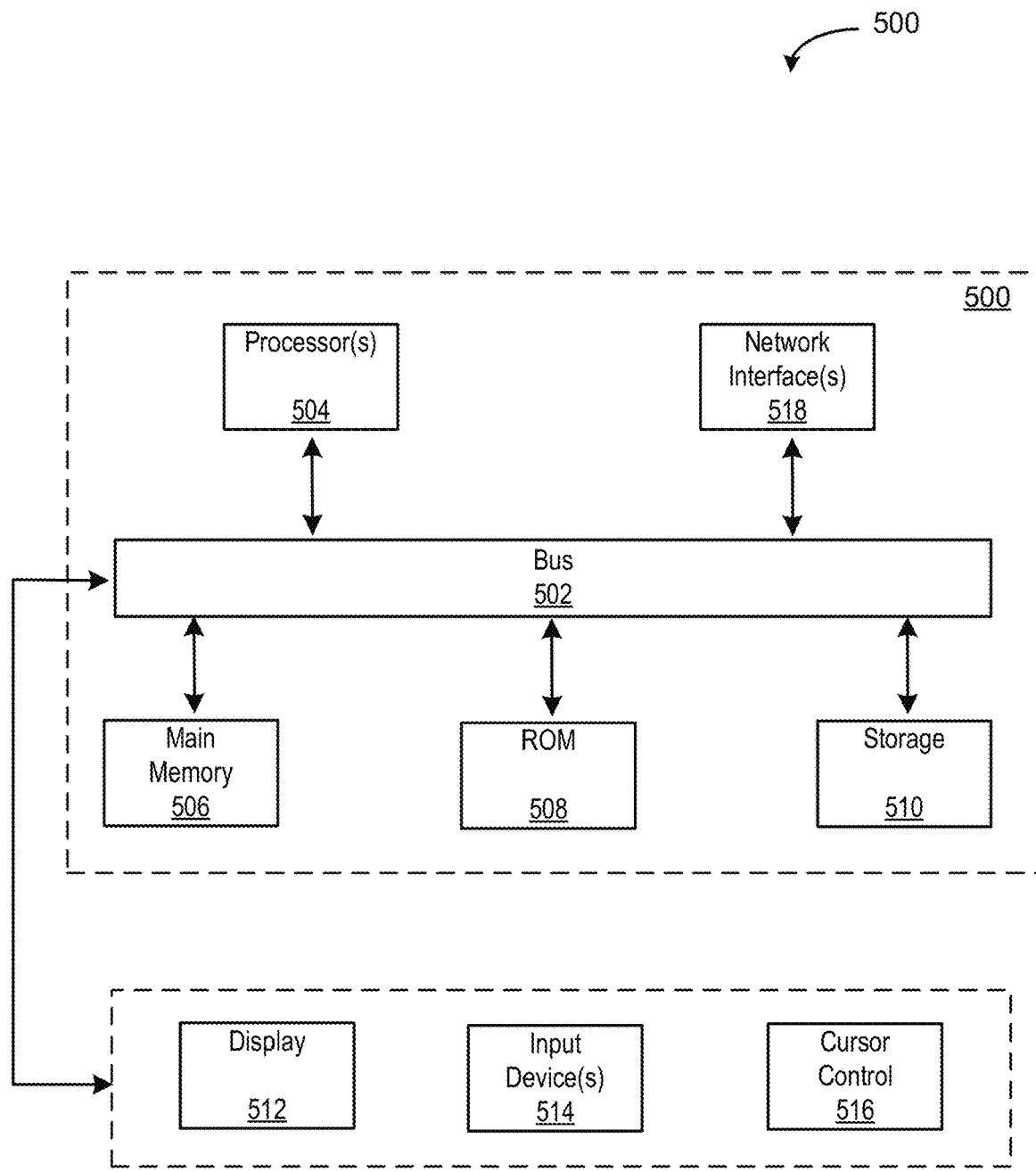
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   receiving, by a processor of a sender node, a request for a collective send operation from a user application, the collective send operation requesting a copy of data in one or more send buffers be sent to each of a plurality of destinations in a destination vector;
   invoking, by the processor of the sender node, a vector send operation from a software communications library;
   placing, by the processor of the sender node, a remote enqueue atomic send command for each destination node of the destination vector in an entry of a transmit data mover (XDM) command queue;
   executing, by the processor of the sender node, all remote enqueue atomic send commands in the XDM command queue; and
   writing, by the processor of the sender node, the data in the one or more send buffers in each receive queue of each destination node identified in the destination vector.

2. The method of claim 1, wherein the destination vector comprises a list of identifiers for each receive queue of each destination address identified by the user application.

3. The method of claim 1, wherein the destination vector comprises a list of identifiers for each receive queue of each destination address identified through a discovery phase.

4. The method of claim 1, wherein receiving the request for the collective send operation comprises receiving, by the processor of the sender node, the destination vector and one or more send buffers from the user application.

5. The method of claim 1, wherein the request for the collective send operation comprises an MPI_Broadcast call.

6. The method of claim 1, further comprising:
   determining, by the processor of the sender node, a send buffer size of one or more send buffers identified in the request from the user application;
   comparing, by the processor of the sender node, if the send buffer size exceeds a buffer size threshold; and
   in response to determining the send buffer size does exceed the buffer size threshold:
      allocating additional command queue resources to use for the vector send operation;
      breaking up the data in the one or more send buffers into a plurality of chunks; and
      placing a remote enqueue atomic send command for each chunk of the plurality of chunks in an entry of a transmit data mover (XDM) command queue, wherein each destination node of the destination vector is associated with a plurality of entries equal to the plurality of chunks.

7. The method of claim 6, further comprising in response to determining the send buffer size does not exceed the buffer size threshold, placing, by a direct memory access (DMA) engine of the sender node, a remote enqueue atomic send command for each destination node of the destination vector in an entry of the XDM command queue.

8. The method of claim 1, further comprising:
   determining, by the processor of the sender node, a data payload size of data associated with the one or more send buffers;
   comparing the data payload size with an in-line message threshold; and
   in response to determining the data payload size does exceed the in-line message threshold, sending the data associated with the one or more send buffers by a generic send operation.

9. The method of claim 8, further comprising in response to determining the data payload size does not exceed the in-line message threshold:
   determining a number of total destinations contained in the destination vector;
   comparing the number of total destination and a destination threshold; and
   in response to determining the number of total destinations exceeds the destination threshold, sending the data associated with the one or more send buffers by a vector send operation.

10. The method of claim 1, further comprising:
   determining, by a processor of a destination node, if the data from the sender node was received in the receive queue of the destination node; and
   in response to determining the data from the sender node was received in the receive queue, reading by the processor of the destination node the data from the receive queue.

11. The method of claim 10, further comprising, in response to determining the data from the sender node was not received in the receive queue:
   generating, by the processor of the destination node, a failure notification; and
   sending the failure notification to the sender node.

12. A system comprising:
   a sender node and a plurality of destination nodes communicatively coupled over a networking fabric;
   the sender node configured to:
      receive, by a processor of the sender node, a request for a collective send operation from a user application, the collective send operation requesting a copy of data in one or more send buffers be sent to each of a plurality of destinations in a destination vector;
      invoke, by the processor of the sender node, a vector send operation from a software communications library;
      place, by the processor of the sender node, a remote enqueue atomic send command for each destination node of the destination vector in an entry of a transmit data mover (XDM) command queue;
      execute, by the processor of the sender node, all remote enqueue atomic send commands in the XDM command queue; and
      write, by the processor of the sender node, the data in the one or more send buffers in each receive queue of each destination node identified in the destination vector;
   each of the destination nodes of the plurality of destination nodes configured to:
      determine, by a processor of the destination node, if the data from the sender node was received in the receive queue of the destination node; and in response to determining the data from the sender node was received in the receive queue, read by the processor of the destination node the data from the receive queue.

13. The system of claim 12, wherein the destination vector comprises a list of identifiers for each receive queue of each destination address identified by the user application.

14. The system of claim 12, wherein the destination vector comprises a list of identifiers for each receive queue of each destination address identified through a discovery phase.

15. The system of claim 12, wherein receiving the request for the collective send operation comprises receiving, by the processor of the sender node, the destination vector and one or more send buffers from the user application.

16. The system of claim 12, further comprising:
determine, by the processor of the sender node, a send buffer size of one or more send buffers identified in the request from the user application;
compare, by the processor of the sender node, if the send buffer size exceeds a buffer size threshold; and
in response to determining the send buffer size does exceed the buffer size threshold:
allocate additional send command queue resources to use for the vector send operation;
break up the data in the one or more send buffers into a plurality of chunks; and
place a remote enqueue atomic send command for each chunk of the plurality of chunks in an entry of a transmit data mover (XDM) command queue, wherein each destination node of the destination vector is associated with a plurality of entries equal to the plurality of chunks.

17. The system of claim 12, further comprising:
determine, by the processor of the sender node, a data payload size of data associated with the one or more send buffers;
compare the data payload size with an in-line message threshold; and
in response to determining the data payload size does exceed the in-line message threshold, send the data associated with the one or more send buffers by a generic send operation.

18. The system of claim 17, further comprising in response to determining the data payload size does not exceed the in-line message threshold:
determine a number of total destinations contained in the destination vector;
compare the number of total destination and a destination threshold; and
in response to determining the number of total destinations exceeds the destination threshold, send the data associated with the one or more send buffers by a vector send operation.

19. The system of claim 12, wherein the sender node further comprises a sender node bridge, the destination node further comprises a destination node bridge, and the sender node and the destination node are communicatively coupled over the network fabric through the sender node bridge and the destination node bridge.

20. A non-transitory machine-readable storage medium storing thereon instructions that when executed by a processor of a sender node causes the processor of the sender node to:
receive a request for a collective send operation from a user application, the collective send operation requesting a copy of data in one or more send buffers be sent to each of a plurality of destinations in a destination vector;
invoke a vector send operation from a software communications library;
place a remote enqueue atomic send command for each destination node of the destination vector in an entry of a transmit data mover (XDM) command queue;
execute all remote enqueue atomic send commands in the XDM command queue; and
write the data in the one or more send buffers in each receive queue of each destination node identified in the destination vector.

* * * * *